United States Patent
Hermey et al.

(10) Patent No.: US 9,464,689 B2
(45) Date of Patent: Oct. 11, 2016

(54) ENERGY CHAIN, PARTICULARLY FOR CLEAN ROOM APPLICATIONS

(71) Applicant: igus GmbH, Cologne (DE)

(72) Inventors: Andreas Hermey, Hennef (DE); Dominik Barten, Meckenheim (DE)

(73) Assignee: igus GmbH, Cologne (DE)

( * ) Notice: Subject to any disclaimer, the term of this patent is extended or adjusted under 35 U.S.C. 154(b) by 0 days.

(21) Appl. No.: 14/778,961

(22) PCT Filed: Mar. 20, 2014

(86) PCT No.: PCT/EP2014/055639
§ 371 (c)(1),
(2) Date: Sep. 21, 2015

(87) PCT Pub. No.: WO2014/147196
PCT Pub. Date: Sep. 25, 2014

(65) Prior Publication Data
US 2016/0061290 A1    Mar. 3, 2016

(30) Foreign Application Priority Data
Mar. 20, 2013  (DE) .................... 20 2013 101 203 U (51) Int. Cl.
| | |
|---|---|
| *F16G 13/16* | (2006.01) |
| *H02G 11/00* | (2006.01) |
| *H02G 3/04* | (2006.01) |

(52) U.S. Cl.
CPC ............ *F16G 13/16* (2013.01); *H02G 3/0468* (2013.01); *H02G 11/006* (2013.01)

(58) Field of Classification Search
CPC ...................................... F16G 13/16
USPC .......................................... 59/78.1
See application file for complete search history.

(56) References Cited

U.S. PATENT DOCUMENTS

| | | |
|---|---|---|
| 3,060,972 A | 10/1962 | Sheldon |
| 4,813,224 A | 3/1989 | Blase |

(Continued)

FOREIGN PATENT DOCUMENTS

| | | |
|---|---|---|
| DE | 7417392 | * 10/1974 |
| DE | 3613431 A1 | 10/1987 |

(Continued)

OTHER PUBLICATIONS

English language PCT Search Report mailed Jul. 16, 2014, received in corresponding PCT Application No. PCT/EP14/55639, 3 pgs.

(Continued)

*Primary Examiner* — David B Jones
(74) *Attorney, Agent, or Firm* — Grossman Tucker Perreault & Pfleger, PLLC (57) ABSTRACT

This invention relates to an energy chain (100; 200 . . . 700) having a number of mutually articulated chain links (212; 312 . . . 812), at least some chain links present a housing (216; 316 . . . 816) for the feed-through of cables and hoses. Adjacent chain links are pivotable against each there by way of hinged connections in such a manner that between a fixed connector (105) and movable connector (107) of said energy chain a movable deflection zone (104) with a predetermined curvature is formed. The invention provides that a bendable tubular envelope (110; 210 . . . 810), in particular a corrugated hose or corrugated tube, surrounds the chain links in the circumferential direction and between said two connectors (105, 107) in a continuous manner. The envelope is supported and entrained by at least some chain links (212; 312 . . . 812) and is sufficiently flexible for absorbing the predetermined curvature of the deflection zone (104) and for following the reciprocating movement thereof.

20 Claims, 6 Drawing Sheets

(56) References Cited

U.S. PATENT DOCUMENTS

| | | | |
|---|---|---|---|
| 5,197,767 A | 3/1993 | Kimura et al. | |
| 5,711,733 A | 1/1998 | Blase | |
| 5,836,148 A | 11/1998 | Fukao | |
| 5,980,409 A | 11/1999 | Blase | |
| 6,516,602 B2 * | 2/2003 | Sakai | H02G 11/006 248/49 |
| 6,745,555 B2 | 6/2004 | Hermey et al. | |
| 6,925,795 B2 | 8/2005 | Komiya | |
| 7,310,937 B2 | 12/2007 | Kim | |
| 7,370,465 B2 * | 5/2008 | Eckl | F16G 13/16 248/49 |
| 7,784,259 B2 | 8/2010 | O'Rourke et al. | |
| 9,328,795 B2 | 5/2016 | Blase et al. | |
| 2008/0121425 A1 | 5/2008 | Harada et al. | |
| 2010/0026043 A1 | 2/2010 | Shima et al. | |
| 2012/0205498 A1 | 8/2012 | Komiya | |
| 2012/0228437 A1 | 9/2012 | Tatsuta et al. | |

FOREIGN PATENT DOCUMENTS

| | | | |
|---|---|---|---|
| DE | 19910128 | * | 1/2001 |
| DE | 102006060252 A1 | | 7/2007 |
| JP | S57177328 U | | 11/1982 |
| JP | H01263545 A | | 6/1990 |
| JP | 2006182547 A | | 7/2006 |
| JP | 2008187882 A | | 8/2008 |

OTHER PUBLICATIONS

English language translation of PCT International Preliminary Report on Patentability mailed Sep. 24, 2015, received in corresponding PCT Application No. PCT/EP14/55639, 9 pgs.

Chinese Office Action with English Translation issued Jun. 20, 2016, received in corresponding Chinese Application No. 2014800224176, 14 pgs.

* cited by examiner

ENERGY CHAIN, PARTICULARLY FOR CLEAN ROOM APPLICATIONS

This invention generally relates to an energy chain for guiding cables, hoses or the like and comprises a number of chain links hinged to each other, at least some of them having a housing for the feed-through of said cables, hoses or the like, and wherein adjacent chain links can be pivoted against each other by means of suitable hinged connections in such a manner that between a fixed connection and a flexible connection of the energy chain a movable deflection zone with a predetermined curvature is formed. In particular, the invention relates to an energy chain that is specifically adapted for the use in a clean room or for applications with similarly high requirements.

Energy chains of this generic kind guide and protect the cables they receive and make sure that the lowest admissible bending radius of these cables is observed. Such energy chains are variously known, for instance from EP0803032B1, WO95/04231A1, or DE3531066A1. Here the hinged connection between adjacent chain links is created by hinge bolts and corresponding recesses. While such energy chains have proved themselves to a great extent, they nevertheless have the disadvantage that the hinged connections are subject to wear as a result of friction forces and thus inevitably produce debris. However, the escape of such debris is undesired, particularly in clean room applications.

With a view amongst others to a reduction of debris, energy chains have already been proposed in which the hinged connections are implemented by flexible hinge elements. Such chains are known for instance from WO02/086349A1 or WO2012/131033A1. Chains which are based on a similar principle and which are generally also suitable for clean room applications are chain types which are disclosed in EP0789167A1, DE102006031907A1 or DE102006060252A1. Although such chains avoid as far as possible the production of debris, they require a specific configuration of the energy chain which mostly adds to the costs.

Further, it is known for energy chains being guided in covers or guide troughs which are closed as far as possible. Also known, e.g. from DE3613431A1 or DE202009005650U1, are energy chains in which the chain links are closed on both sides along the narrow sides of the lateral regions by means of cover plates. These two approaches however aim at the protection of the energy chain and the cables guided therein against dirt, dust and other environmental influences. These solutions are generally not suitable for reliably minimizing or preventing the escape of debris from the energy chain into the environment.

From DE7417392U an energy chain from a synthetic material is known which is surrounded by a flexible metal hose. Said metal hose protects the energy chain and the cables therein against damage from outside, particularly by hot chips. Here the metal hose is combined of individual profile sections that engage each other. But even this solution does not prevent the release of debris into the environment. It rather produces additional debris or fine metal powder as a result of friction of the profile sections against one another.

On the other hand, from DE102012100290A1 a cable guide is known which prevents the emission of fine dust caused by abrasion from e.g. the cables or the like to the outside. Here the supporting elements that are interconnected in a chain-like manner and the cables are guided side by side in tubular supporting sections of a flexible belt element made of synthetic resin. Said belt element surrounds the cables and the string of supporting elements and is sealed on the end thereof in a dust-proof manner so that the debris remains captured inside the belt element. This special solution again has a complex construction and does not allow for the use of a proven and tested energy chain.

Accordingly, it is an object of the present invention to propose an energy chain which can reliably reduce or even completely prevent the release of debris while allowing for the use of established and proven configurations of conventional energy chains.

This object is achieved independently by an energy chain as defined in claim 1, a chain link as defined in claim 13, and a modular segment as defined in claim 14.

In a particularly simple configuration, the above-mentioned object in an energy chain according to the generic part of claim 1 is already achieved by a flexible envelope surrounding the chain links both in the circumferential direction and between both connection ends in a continuously closed manner. Here the envelope is configured in such a manner that it is supported and entrained by at least some chain links while being sufficiently flexible for absorbing the predetermined curvature in the deflection zone and for following the reciprocating movement of the deflection zone.

The envelope is preferably configured in a tubular manner and its resistance to the reciprocating movement of the chain links should be kept as low as possible by a suitable material selection and/or design. The envelope according to the invention extends in a closed manner over a plurality or all of said chain links between the connection ends of the energy chain and thus functions as a containment or protective envelope which prevents in a simple manner that released debris such as abrasion particles from the chain links or also from the cables escape to the surroundings. To that effect, a configuration of the envelope is provided which is hermetically sealed to the greatest possible extent. At least, said envelope must be constructed in a tight manner and sealed to such an extent that the vast majority of crucial particles cannot escape from the region of the energy chain, i.e. the envelope must be dust-proof. The material of the envelope itself should preferably be abrasion-proof and elastic.

Preferably, the shape of the envelope matches the cross section of chain links of chain types that have already proved.

In a particularly preferred embodiment, the envelope is formed continuously in one piece in the longitudinal direction between both connection ends and preferably consists of a synthetic material. Preferably, said synthetic material is one like polyamide for example, if necessary with a low percentage of additives, which affords a thin-walled and permanently flexible corrugated tubular envelope which is yet shock-proof and resistant to buckling. In particular, said synthetic material should be abrasion-proof and preferably resistant to chemical media and to heat up to 80° C. minimum, preferably 102° C.

Advantageously, a connecting flange for the dust-proof sealing of the open ends of the envelope is respectively provided at the fixed connection end and at the movable connection end of the energy chain.

In a preferred configuration, each connecting flange is composed of two clamp collars, which can be connected in a dust-proof manner and non-positively and/or positively hold the envelope in a front end portion or secure the envelope in the longitudinal direction while surrounding the envelope in a dust-proof manner. Preferably, said clamp collars also present fixing means, in particular a suitable pattern of holes for a screwed fastening to connecting elements of the energy chain. In this manner, the fixing of the energy chain and dust-proof closure thereof can be implemented with only a small number of parts, particularly with clamp collars in the form of injection molded parts. Here it is advantageous for each connecting flange to include in a rear end section a feed-through sealing gasket for the dust-proof feed-through of said cables, hoses or the like. Suitable for this purpose are for instance blocks of synthetic materials such as polyurethane or neoprene which are provided with a pattern of holes corresponding to the number and cross section of the cables that are guided. In this manner, the feed-through sealing gasket can be optionally adapted. Preferably, the feed-through sealing gasket is urged against the cables by being clamped between the clamping collars after the same are fixed.

An alternative construction provides for the envelope being composed in the longitudinal direction of a plurality of modular segments, wherein the segments are respectively connected to each other while being closed in the circumferential direction. Due to these segments, a string of chain links may optionally be made shorter or longer, and the segments also provide easy access to the chain links and cables and simplify the construction. At this juncture, at least some of these modular segments each comprise preferably a first and a second half-shell.

Separable half-shells even more facilitate the access to the chain links and cables that are guided, for example for maintenance and repair purposes. In segments that are composed of half-shells, these latter are preferably configured for being connected to longitudinal joints at the level of the neutral fiber layer of the energy chain in a closed manner. This minimizes a tendency of the half-shells to cracking or gaping in the deflection zone. As an alternative to segments composed of half-shells, one-piece segments can be provided which are circumferentially fully closed and which extend the length of at least one chain link, preferably of several chain links.

For reducing the number of components, the half-shells that are used are preferably identically designed and are provided with mirror-symmetrically arranged mechanical connectors in order to connect two half-shells to each other. Thus the half-shells can be fabricated for example in an injection molding process, similar to the chain links which are made of a synthetic material. Suitable mechanical connectors are for example snap, detent and/or clamp-type connectors and the like or any connectors that make a contribution to combined half-shells surrounding one or more chain links in a circumferentially closed manner.

Preferably, the invention further provides that the half-shells present protrusions in the region of the longitudinal joints, particularly on both sides along the neutral fiber layer, which protrusions can be secured by means of additional clamping strips. This ensures that the half-shells will not gape even in the bent state or in the deflection zone. Hence the use of clamping strips from a bendable or flexible synthetic material which absorbs the curvature of the deflection zone is also advantageous. Further advantageously, teeth can be provided on each half-shell towards the side of the longitudinal joint, said teeth engaging with corresponding teeth on the opposing half-shell, which is thus secured against displacement in the longitudinal direction.

The alternative configuration provides for adjacent segments of the envelope being respectively connected to each other at their front faces and in a circumferentially closed manner by means of additional connecting elements. In this connection, the opposing front faces of the segments are either designed for positively engaging each other or for being connected by positive-fit and/or force-fit to an interposed connecting element in a closed manner. In the case of a positive-fit engagement, a circumferential additional connecting element, for example in the form of a clip, can be provided for securing the mutually engaging segments to one another in the circumferential and longitudinal directions.

For the mutual connection of individual segments of the envelope and/or for holding the envelope on individual chain links, frame-like brackets can be provided as connecting elements. These can frame the respective chain link particularly in the circumferential direction, for the connection to the segments. Such brackets can be attached as separate components e.g. to crossbars of individual chain links, or can themselves constitute the crossbars between the lateral regions if designed in a corresponding manner. The first-mentioned construction avoids departure from previous configurations, whereas the latter-mentioned construction simplifies the assembly of the energy chain.

As already mentioned at the beginning, the invention advantageously provides for the cross section of the envelope matching the chain links. Hence the envelope surrounds the chain links both in the circumferential and longitudinal directions with little or mechanically minimum play or snuggles against the outer contours of the chain links. This prevents unnecessary wear and also an increased noise development as a result of a dangling envelope. In addition, the entrainment of the envelope by the chain links is achieved in a simple way.

For the adaptation to the cross section of the chain links and at the same time for providing an inexpensive construction, a particularly preferred configuration provides for the envelope being a corrugated tube-like design, in particular with a substantially oval, elliptical or rectangular rounded cross section transversely to the longitudinal direction.

A corrugated hose or corrugated tube is a flexible hose whose diameter changes in a wave-like fashion in the longitudinal progression. Preferably, the width of the oval, elliptical or slot-like cross section measured on the outside is at least one and a half times and preferably at least two times the height, in order to obtain a favorable dimension of the useful interior space of the corrugated tube.

Particularly preferably, the envelope is configured as a corrugated tube having a periodical wavelength, i.e. a distance between adjacent wave troughs or wave crests of the waveform which is at least twice the pitch of the link chain composed of interconnected chain links. The pitch corresponds to the distance between the adjacent swivel axes or, in the case of a link chain comprising elastically bendable joint elements, to the periodic center of two successive hinge elements.

The combination of a corrugated tube-like envelope with a link chain in which adjacent chain links can be respectively pivoted against each other by means of a hinged connection comprising at least one elastically bendable hinge element, e.g. according to WO 02/086349A1 or WO 2012/131033A1, have proven surprisingly advantageous in experiments.

To prevent a release of abrasion particles also at the transition in the region of the fixed or movable end of the energy chain, a connecting flange for hermetically sealing the open ends of the envelope is respectively provided preferably on both the fixed connection and movable connection. These connecting flanges can comprise connecting elements for the chain links, receive such connecting elements or also constitute such connecting elements.

The proposed solution is specifically suitable, although not exclusively, for the use of chain links having opposing lateral regions which are connected by crossbars and whose intermediate space forms the housing for the cables to be fed through.

It will be particularly appreciated that from now on conventional energy chains having a hinge bolt/recess-type hinge connection can be used even in clean room applications.

Generally, it would be possible to use as an inexpensive envelope conventional corrugated tubes with suitable dimensions and with a cross section which is correspondingly adapted if necessary. As mentioned above, a division into segments is not compulsory at this juncture, i.e. the corrugated tube may be formed continuously or as one piece between the two connections. Experiments have shown that this configuration is particularly well suited for many applications.

In this connection, it is provided for the chain link having a rounded cross section transversely to its longitudinal direction, particularly in the central region with respect to the longitudinal direction, this rounded cross section being adapted to a corresponding cross section of an envelope. This oval, elliptical or circular contour can be obtained by a corresponding design of the lateral regions, which are mostly configured as lateral connecting links, and if necessary also by a corresponding design of the crossbars connecting the same. Depending on the respective application, also a corresponding one-piece construction of the entire chain link can be useful.

In addition to such a chain link, the invention also relates to a modular segment for the fabrication of an envelope adapted to known chain links, the segment comprising one or more of the above discussed features pertaining to the segment.

Finally, it should be noted that an energy chain which is constructed in accordance with the invention not only is inexpensive and reliably protects the environment against abrasion particles from the chain components or from the cables which are guided, but can be used on the other hand also for protecting the cables against environmental influences.

Further details, advantages and features of the invention will become apparent from the following description of preferred embodiments with reference to the attached drawings wherein it shown by.

Figure 1:
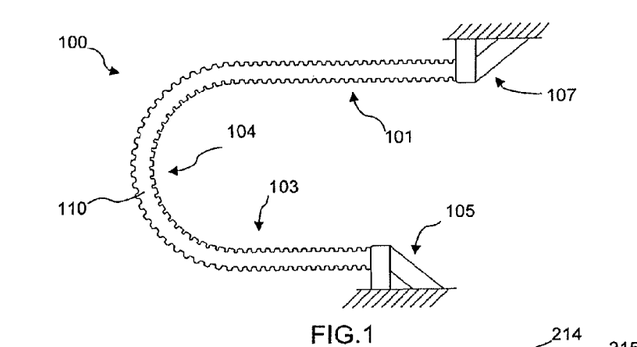
FIG. 1 a schematic diagram of an energy chain according to the invention, in a lateral view.

In FIG. 1, a schematically illustrated energy chain is generally identified by reference number 100. Energy chain 100 serves for the protective guiding of cables, hoses and similar supply lines not further shown in the drawings.

Between the upper run 101 and the lower run 103 of energy chain 100 a deflection zone 104 is provided in a known manner, which has a predetermined fixed curvature to prevent breakage of cables. The deflection zone 104 ensures that the admissible bending radii of the guided cables do not go below the limit. The deflection zone 104 can reciprocate, for example in the upper run 101, over a distance relative to the fixed connector 105, for example on the lower run 103, together with the movable connector 107 and thus correspondingly follows the movement of the movable connector 107.

Further, a flexible, tubular envelope 110 surrounding the chain links (see FIGS. 2-6) of the energy chain 100 in the circumferential direction and between said two connectors 105, 107 in a continuous, closed manner is shown as an essential aspect of the invention in the schematic diagram of FIG. 1. FIG. 1 further illustrates that the envelope 110 is supported and entrained by at least some chain links (see FIGS. 2-6). As further apparent from FIG. 1, the tubular envelope 110 is constructed sufficiently flexible, for instance by a suitable configuration and/or material selection, in order to compensate the predetermined fixed curvature of the deflection zone 104 and to follow the reciprocating movement of the deflection zone 104 preferably unresistingly.

Figure 2A:
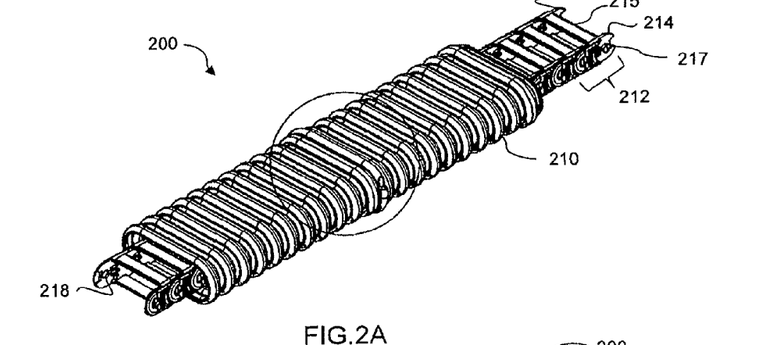
FIGS. 2A-2D a perspective view (FIG. 2A), a lateral view (FIG. 2B), a cross-sectional view (FIG. 2C), and an enlarged detail (FIG. 2D) of a partly cut-open section of a first embodiment of an energy chain according to the invention.
Figure 2B:
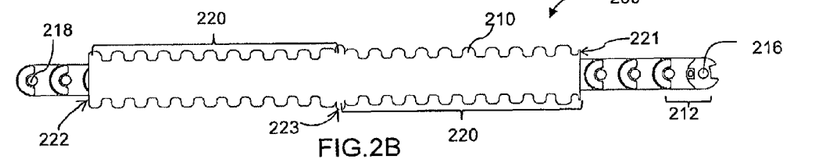
Figure 2C:
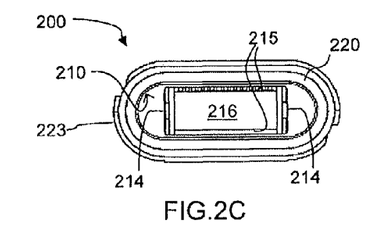

The FIGS. 2A-2D partly illustrate a section of an energy chain 200 according to a first embodiment. The energy chain which is exemplified in the FIGS. 2A-2D, has a structure known per se and for which reference is made to DE3531066 as an example. The chain links 212 are each composed for instance of two lateral parts or lateral connecting links 214 and two crossbars 215 connecting these lateral connecting links 214. As can be seen in FIG. 2C, each chain link 212 forms an interior space between the lateral connecting links 214 and the crossbars 215 which serves as a housing for the feed-through of the cables. As an alternative, crossbars 215 for the connection of the mutually opposite parallel strings of lateral connecting links 214 may be provided only at every other chain link 212. Also, it is unimportant whether the crossbars 215 such as described for example in DE3531066 are attached as components separate from the lateral connecting links 214 or one of the crossbars 215 or both of them are formed integrally with the lateral connecting links 214.

Except for the fact that the chain links 212 may be pivotally connected by means of hinge bolts 217 and correspondingly formed recesses 218, other structural features and characteristics of the chain links 212 presently are of secondary importance and may be chosen in a manner known per se.

Figure 2D:
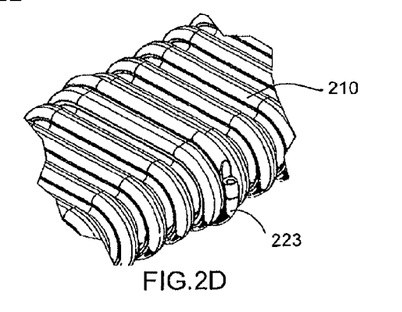

As it can be seen from the FIGS. 2A-2D, the energy chain 200 according to the invention comprises a tubular envelope 210, which is hermetically sealed in the circumferential and longitudinal directions. The envelope is composed in sections thereof of individual segments 220. According to the FIGS. 2A-2D, each segment 220 is a one-piece construction in the circumferential direction and is circumferentially fully closed, as can be seen in FIG. 2C. Each segment 220 is configured in a corrugated tube-like fashion. For the hermetically sealed connection of two segments 220 adjoining each other in the longitudinal direction, the segments 220 are each configured in such a manner that their opposing front ends 221 or 222 engage each other in a form-fit manner. As best shown in FIG. 2B, this can be achieved by correspondingly selecting the position of the front ends 221, 222 with regard to the wavelike contour. For its securing in the longitudinal and circumferential directions, the envelope 210 respectively includes a suitably fashioned clip 223 between two adjacent segments 220. This clip 223 serves as an additional connecting component surrounding interconnected segments 220 in the region of the front ends 221, 222 in the circumferential direction and holding these segments together in a force-fit manner, as illustrated in FIG. 2D.

For forming a continuous envelope 210 around the chain links 212 according to the principle of FIG. 1, the segments 220 are fabricated from a suitable, elastic synthetic material. In the example according to the FIGS. 2A-2D, the segments 220 may be constructed as one piece. In the cross section according to FIG. 2C, the segments are each oval and abut on the crossbars 215 with little play, while the play may be larger towards the lateral connecting links 214. Thus a structure of the chain links 212 can be used which is known per se and which particularly comprises hinged connections using hinge bolts 217 and recesses 218, without any abrasion material escaping from it.

In the FIGS. 3A-3D, a further energy guiding 300 chain is shown in sections and partly cut open. Energy chain 300 is different from the previously described example according to the FIGS. 2A-2D only in the structure of the envelope 310. The structure and function of the chain links 312 are known per se and correspond for example to the previous description. For identifying known parts of the chain links 312 in the FIGS. 3A and 3C, the respective reference numbers are increased by one hundred.

Figure 3A:
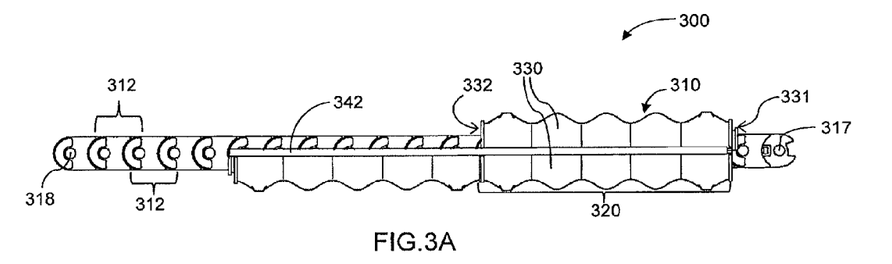
FIGS. 3A-3D a lateral view (FIG. 3A), a cross-sectional view (FIG. 3C) of a partly cut-open section of a further embodiment of the energy chain according to the invention; and a lateral and perspective view respectively of a half-shell of an enveloping segment (FIG. 3A or FIG. 3B)
Figure 3B:
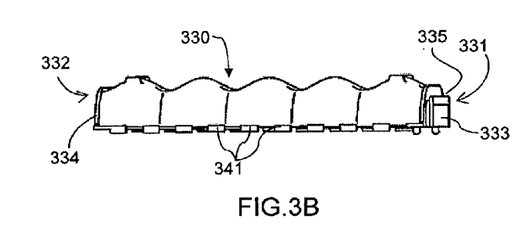
Figure 3C:
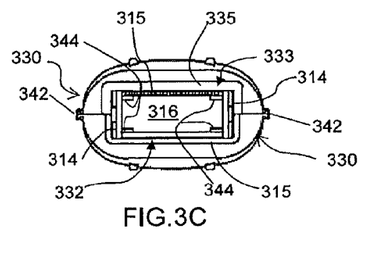
Figure 3D:
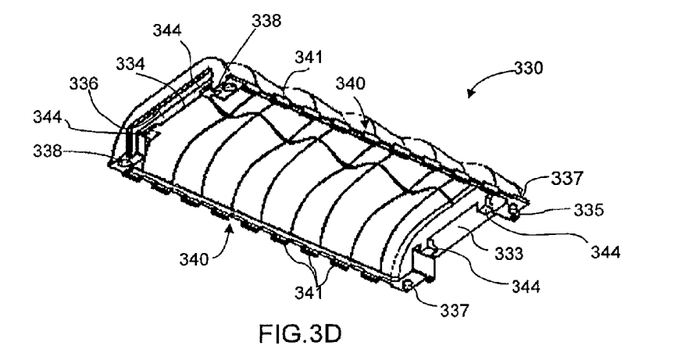

The envelope 310 of the energy chain 300 according to the FIGS. 3A-3D is composed of a plurality of identically formed half-shells 330. In this case, two half-shells 330 opposing each other in the transverse direction respectively constitute one segment 330 of the envelope 310 in the longitudinal direction of the energy chain. The front ends 331, 332 of the half-shells 330 each comprise two different, coactively constructed retaining clips 333, 334. One of said retaining clips 333 includes a frontal locking strip 335 for engaging a congruently configured locking groove 336 of the co-acting retaining clip 334 on the opposite side. Said one clip 333 also includes snap tabs 337 at least on each longitudinal side which engage in correspondingly formed recesses 338 of the co-acting clip 334. Said snap tabs 337 and recesses 338 are constituent parts of a mechanical connection for fixing two half-shells 330 opposing each other in the transverse direction. For the continuous fixing of the opposing half-shells 330 in the transverse direction, each of the half-shells 330 additionally comprises teeth 340 on the longitudinal sides, which run along the longitudinal direction of the energy chain 300. The teeth 340 of two opposing half-shells 330 mesh with each other in the assembled state, while individual protrusions 341 of said teeth 340 protrude in the lateral direction or transversely to the longitudinal direction, which is seen best in FIG. 3C. As shown in FIG. 3A, a clamping strip 342 which is flexible in the bending direction of the chain links 312 is attached to these protrusions 341 so that the half-shells 330 remain rigidly connected to each other also in the deflection zone 304. For the additional connection of the half-shells 330 to sporadic chain links 312, engagement hooks 344 are further provided on the clips 333 which engage behind the crossbar 315 in the region of the corresponding front end 331, 332. The half-shells 330 are so dimensioned that the protrusions 341 and hence the clamping strips 342 will be positioned on both sides at the level of the neutral fiber layer of the chain links 314 to be enveloped.

Figure 4A:
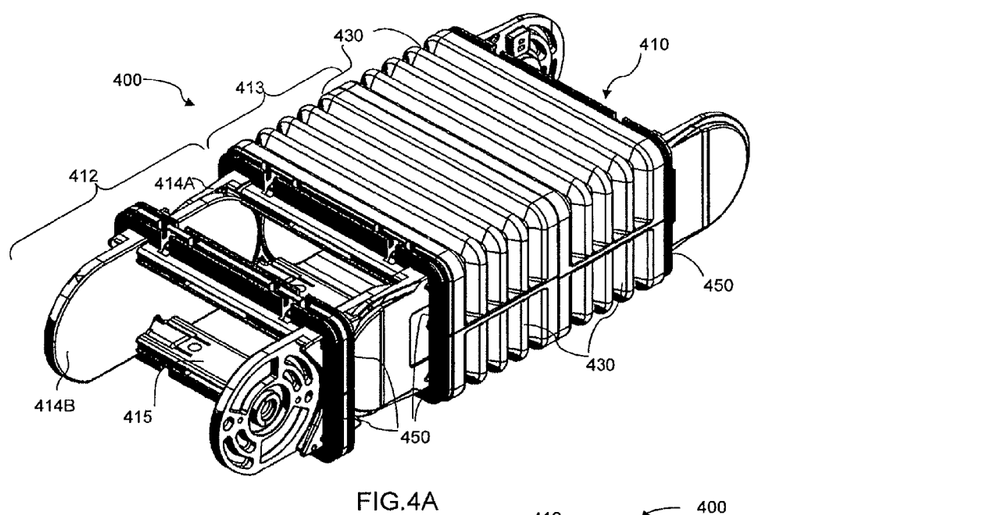
FIGS. 4A-4C a perspective view (FIG. 4A), a lateral view (FIG. 4B), and a cross-sectional view (FIG. 4C) of a partly cut-open section of a further embodiment of an energy chain according to the invention.
Figure 4B:
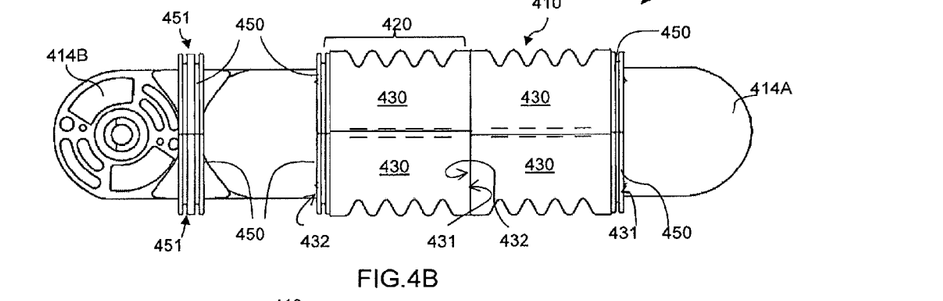
Figure 4C:
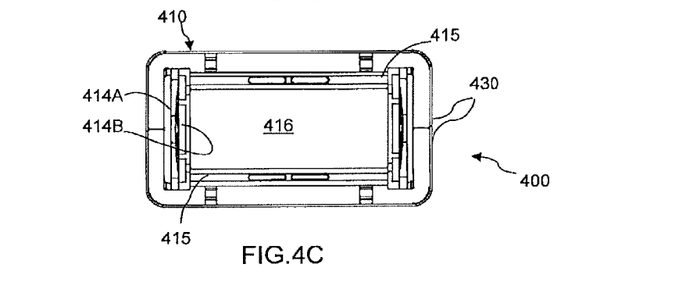

The FIGS. 4A-4C illustrate a third preferred embodiment of an energy chain 400 of the invention, which is shown in sections and incomplete. In this example, the structure of the individual chain links 412, 413 is in turn known per se, but corresponds in its main features to a configuration according to WO95/04231, with different inner and outer connecting links. In these chain links 412, 413, the lateral regions or lateral connecting links 414A, 414B also form parallel strings of connecting links, which are connected by crossbars 415 and which form a free inner space as a housing 416 for the cables to be guided.

However, the energy chain 400 according to the FIGS. 4A-4C is in turn different, above all by the configuration of the envelope 410. In the longitudinal direction, said envelope 410 is composed of relatively short longitudinal sections or segments 420. Each segment 420 consists of two correspondingly short half-shells 430 that surround two adjacent chain links 412, 413 in the circumferential direction, and of two assembled connecting parts 450. Said connecting parts 450 surround the corresponding chain link 412 or 413 as frame-like brackets. Each connecting part 450 includes a corresponding holding groove 451 suitable for each front end 431, 432, and the front end 431, 432 of a half-shell 430 engages and becomes locked in said holding groove in a form-fit manner. Each frame-like connecting part 450 additionally comprises, in the configuration according to the FIGS. 4A-4C, the respective crossbar 415 for the connection of the opposing link plates 414A or 414B. Accordingly, the connecting parts 450 can be fixed to the fixing structures of the connecting links 414A, 414B which are usually provided for crossbars. Corresponding to the longitudinal distance between the crossbars 415, a segment 420 of the envelope 410 in the energy chain 400 has a dimension in the longitudinal direction which is approximately half the length of a chain link 412, 413. In the case of crossbars which are only provided between every other pair of connecting links, the length of the segments 420 doubles. As can be seen in FIG. 4C, the width and the height of the segments 420 or half-shells 430 substantially corresponds to the cross section of the chain links 412, 413, except of the outer dimension of the connecting parts 450. The longitudinal sides of the half-shells 430 are positioned approximately at the level of the neutral fiber layer and can be connected to each other in a form-fit manner or in any other suitable manner. Due to the short length of the half-shells, the connection needs not be particularly strong.

Figure 5:
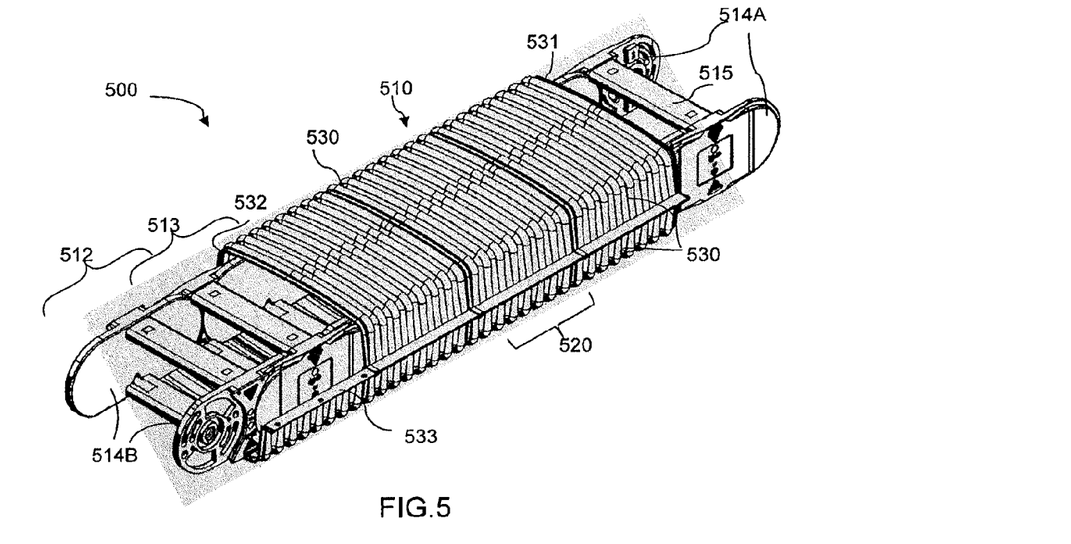
FIG. 5 a perspective view of a fourth embodiment of the energy chain according to the invention.

FIG. 5 shows an energy chain 500 according to a further embodiment. In this case, too the individual chain links are constructed as described in WO95/04231 and correspond to the chain links 412, 413 of the FIGS. 4A-4C, except for the configuration of the crossbars 515 between the lateral link plates 514A, 514B. However, the envelope 510 according to FIG. 5 has a simplified design and does without connecting parts, screw terminals, and clamping strips. In the envelope 510 according to FIG. 5, each segment 520 consists of two half-shells 530.

Each segment 520 or each half-shell 530 extends in the longitudinal direction approximately the distance of one chain link 512, 513. Longitudinally adjacent half-shells 530 engage each other in a form-fit manner by their front faces 531, 532. The longitudinal sides of the half-shells 530 opposing each other in the transverse direction have protruding strips 533 on both sides thereof, which are provided with mirror-symmetrically arranged mechanical connectors such as detents on one side and corresponding recesses on the opposite side. By an appropriate selection of the material of the half-shells 530, a relatively simple modular design is obtained which, as in the FIGS. 3A-3D and 4A-4C, provides selective access to chain links 512, 513 and cables arranged therein and thus simplifies repair work section by section.

Similar to the embodiments shown in the FIGS. 3A-3D and 4A-4D, the longitudinal joint between the half-shells 530 in energy chain 500 is also positioned approximately at the level of the neutral fiber layer, which is predetermined by the chain links 512, 513 that are used, in FIG. approximately centrally between the narrow sides of the lateral link plates 514A, 514B.

Figure 6A:
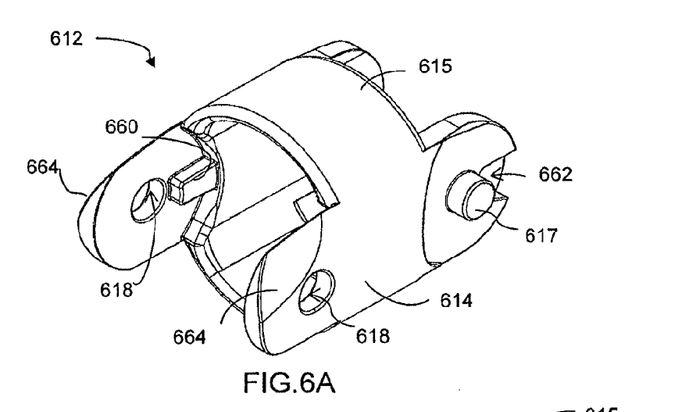
FIGS. 6A-6C a perspective view (FIG. 6A), a lateral view (FIG. 6B), and a cross-sectional view (FIG. 6C) of an inventive chain link for envelopes having a round cross section.
Figure 6B:
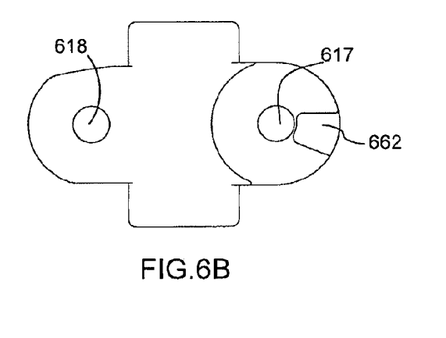
Figure 6C:
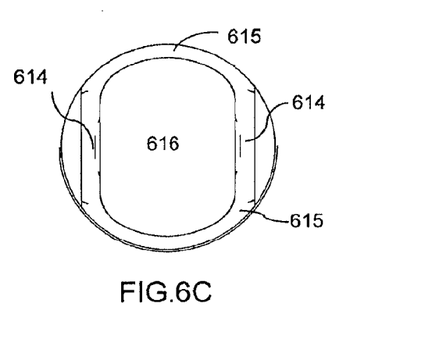

The FIGS. 6A-6C show a chain link 612 especially suited for its encapsulation by an envelope having a round cross-section. Said chain link 612 consists of a link body, which is constructed as one piece from a synthetic material using an injection molding process. Accordingly, the chain link 612 is only comprised of a single component and has two side regions that are integrally connected by arc-shaped crossbars 615.

At least the central part of the side regions 614 together with the crossbars 615 creates a substantially circular outer cross section, which is best seen in FIG. 6C. In the longitudinal direction, hinge bolts 617 and corresponding recesses 618 are respectively provided on the opposing ends of the side regions 614 in order to provide a hinged connection between two adjacent chain links 612. Inner protrusions 660 cooperate in the known manner with correspondingly formed recesses 662 in the chain link 612 and thus act like dogs for limiting the pivoting movement. By an appropriate tapering 664 for example, the strap-like side regions 614 of the one-piece chain link 612 are formed in such a manner that the same can be plug-fitted onto each other by spreading.

As best seen in FIG. 6C, this configuration provides a cross section that is particularly suited for the use of tubular and especially corrugated tube-like envelopes having a round cross section. Thus suitable envelopes can be provided in an inexpensive way by using already known manufacturing methods, similar to those used for fabricating typical corrugated tubes.

Figure 7A:
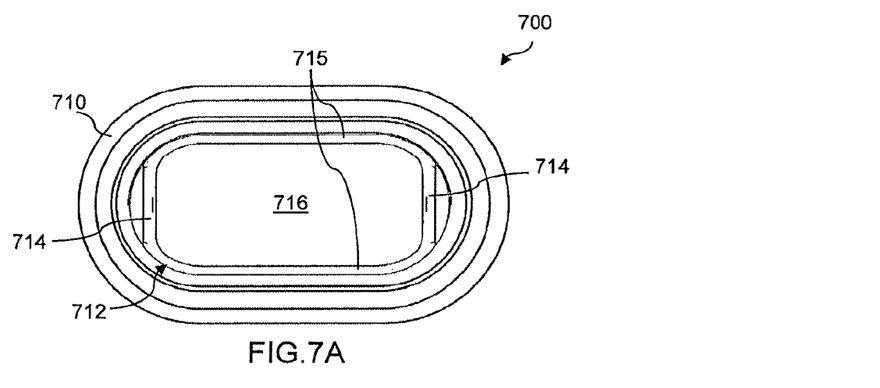
FIGS. 7A-7B a cross-sectional view and a lateral view of a further, preferred embodiment of an energy chain according to the invention.
Figure 7B:
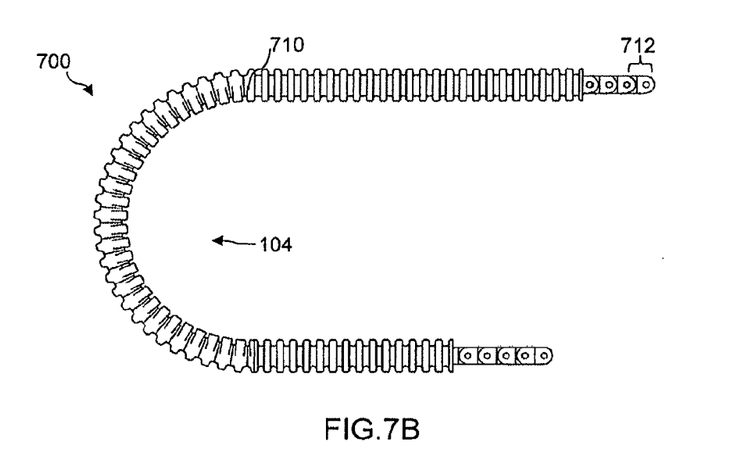

The FIGS. 7A-7B show a further embodiment of an energy chain 700, wherein in the following only features are described which are different from those of the foregoing embodiments. The envelope 710 according to the FIGS. 7A-7B has a cross section corresponding to that in FIG. 2C, but is continuous in the longitudinal direction, i.e. a one-piece construction without interruption or segmenting and connecting parts between the two connectors 105, 107, as schematically shown in FIG. 7B. Analogously to the FIGS. 6A-6C, the chain links 712 can be one piece, but may be formed with a oval, elliptical or rectangular rounded cross section, as shown in FIG. 7A. As an alternative, the chain links 712 can also be composed of individual parts in a known manner. The latter-mentioned variant can be obtained by modifying proven and tested configurations (see also FIGS. 2A-2D, 3A-3D), particularly the lateral link plates, so as to exhibit an oval or rectangular rounded cross section.

The embodiment according to the FIGS. 7A-7B affords a good compromise between an inexpensive and reliable construction of the envelope 710, with a minimum deviation from proven and tested chain link constructions. One advantage of the rounded cross section of the chain links 712 resides in the improved entrainment of the envelope 710, particularly in the deflection zone 104.

For the hermetical or dust-proof closure of the envelopes 110, . . . 810 at the fixed connector 105 and at the movable connector 107 of the energy chain, an appropriately designed connecting flange is respectively provided at the open ends of the envelope. With that addition, the envelopes 110, . . . 180 reliably prevent debris and other particles from escaping from the region of the energy chain into the environment.

Figure 8A:
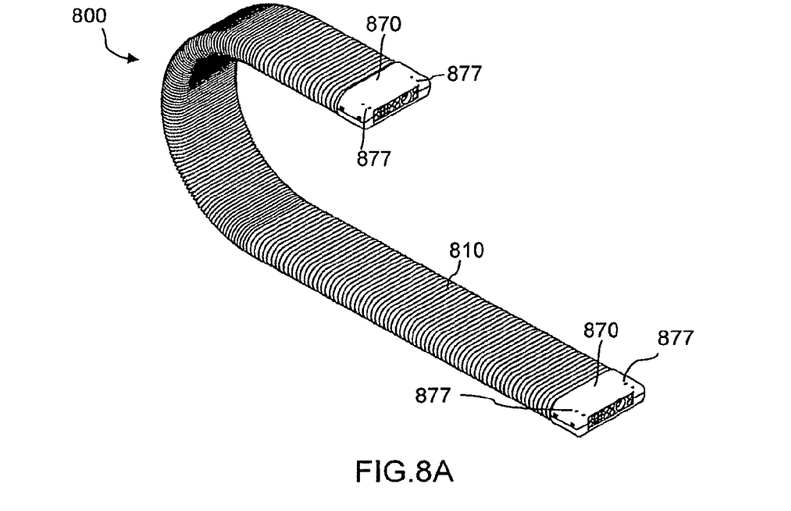
FIGS. 8A-8C a perspective view and a lateral view of a particularly preferred embodiment of an energy chain and of connecting flanges for the envelope.
Figure 8B:
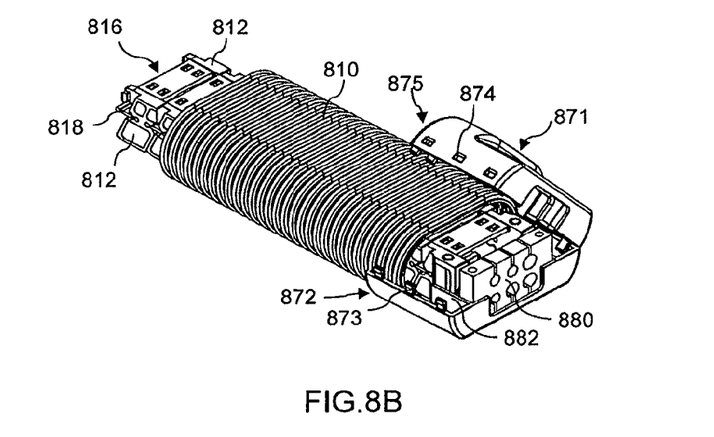
Figure 8C:
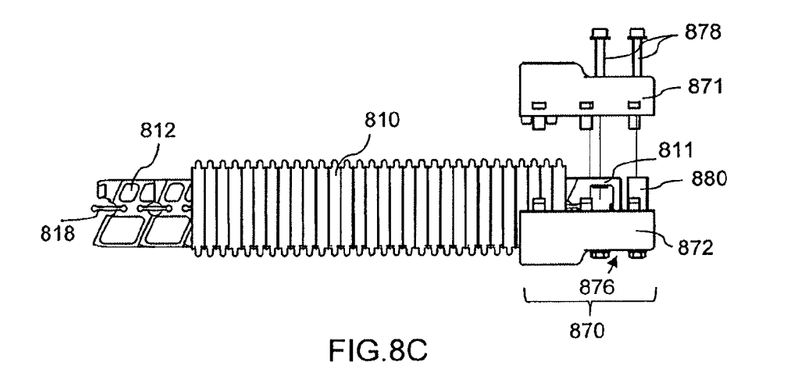

The FIGS. 8A-8C show a preferred embodiment of suitable connecting flanges and a further, particularly preferred embodiment of an energy chain 800 for use in a clean room.

Similar to the example in the FIGS. 7A-7B, the energy chain 800 has a corrugated tube-like envelope 810, which is manufactured as one piece over the entire length thereof, as illustrated in FIG. 8A. The envelope 810 is fabricated as a corrugated tube having parallel corrugations and a slot-like cross section from polyamide, e.g. in an extrusion process.

The FIGS. 8B-8C respectively show an exploded view of only a part of the envelope 810 or the energy chain 800, namely one of the two analogously designed end sections, each of which including one of the said identically constructed connecting flanges 870. At the same time, said connecting flanges 870 serve for the dust-proof sealing of the open ends of the envelope 810 and fixing thereof to connecting elements 811, which constitute the last links in the string of chain links 812 and are configured for being fixed to the connectors 105, 107 in a manner known per se.

For the purpose of sealing and fixing, each connecting flange 870 is composed of two cooperating clamp collars 871, 872 that are configured as lid-like injection molded parts connectible in a dust-proof manner. Said clamp collars 871, 872 can be locked to each other by means of detent hooks 873 and recesses 874. Said closed clamp collars 871, 872 hold the envelope 810 in the longitudinal direction in a force and/or form-fit fashion, particularly in a form-fit fashion, in a front end portion 875 by the engagement with one or several wave troughs, and circumferentially seal the envelope 810 in a dust-proof manner, if necessary using an additional sealing gasket (not shown).

As shown by the FIGS. 8A and 8C, for the purpose of fixing, both clamp collars 871, 872 are provided with through holes 877 for connecting screws 878 matching screw sockets in the connecting elements 811. Said front through holes 877 serve for the screw connection with the connecting elements 811. In the rear end portion 876, additional through holes 877 are provided for connecting screws 878, which clamp a feed-through sealing gasket 880 for the feed-through of cables, hoses and the like in a dust-proof manner. Due to this design of the clamp collars 971, 872, it is possible to seal the envelope 810, to secure the envelope 811 to the connecting elements 811, and to fix both ends of the energy chain 800 to the connectors 105, 107 (cf. FIG. 1) in one working step. Said separate feed-through sealing gasket 880 in each connecting flange 870 is compressible and is provided with cable recesses. The feed-through sealing gasket 880 can be configured for example as a one-piece polyurethane block or as a neoprene multi-layer stack. In the rear end portion of the clamp collars 871, 872, a respective inside bracket 882 for the connecting elements 811 and for the feed-through sealing gasket 880 is provided.

The FIGS. 8B-8C further illustrate a cable guide according to WO 02/086349A1 which for clean room applications is preferably combined with an envelope 810 in the form of a corrugated tube. Here the chain links 812 are respectively coupled to each other by elastically bendable hinge elements 818. Such cable guides have the additional advantage of preferably reducing possible wear debris between the chain links 812 and the envelope 810 and achieving smooth running despite said additional envelope 810.

Figure 9A:
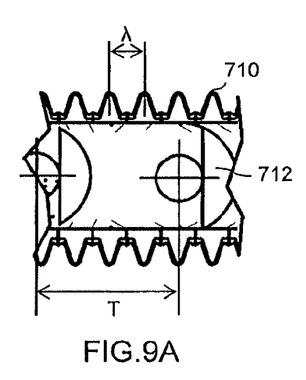
FIGS. 9A-9B longitudinal sections illustrating the preferred pitch/wavelength relationship of a corrugated tube used as an envelope.
Figure 9B:
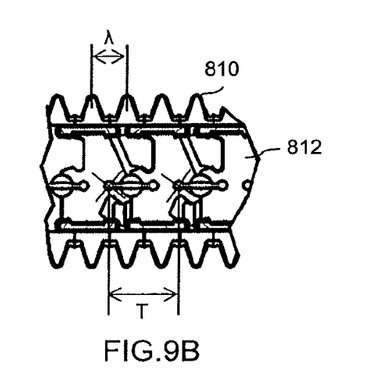

The FIGS. 9A-9B illustrate the preferred relation of the pitch T of the inside cable guide consisting of chain links 712, 812 according to the FIGS. 7A-7C or FIGS. 8A-8C to the wave length λ of an envelope 710 or 810 configured as a corrugated tube. Preferably, the corrugated tube is designed in a manner such as to satisfy the relation $T/\lambda \geq 2$, preferably $T/\lambda \gg 2$, to achieve all in all a favorable running performance, durability, and good flexibility.

LIST OF REFERENCE NUMBERS

FIG. 1:
100 energy chain
101 upper run
103 lower run
104 deflection zone
105 fixed connector
107 movable connector
110 tubular envelope
FIGS. 2A-2D:
200 energy chain
210 envelope
212 chain links
214 lateral link plates
215 crossbars
216 housing
217 hinge bolt
218 recess
220 segments
221 front end
222 front end
223 clip
FIGS. 3A-3D:
300 energy chain
304 deflection zone
310 envelope
312 chain links
315 crossbar
320 segment
330 half-shell
331 front end
332 front end
333 retaining clip
334 retaining clip
335 locking strip
336 locking groove
337 detent
338 recesses
340 teeth
341 protrusions
342 clamping strip
344 engagement hooks
FIGS. 4A-4C:
400 energy chain
410 envelope
412 chain link
413 chain link
414A, 414B lateral link plates
415 crossbar
416 housing
420 segment
430 half-shell
431 front end
432 front end
450 connecting part
451 holding groove
FIG. 5:
500 energy chain
510 envelope
512 chain link
513 chain link
514A, 514B lateral link plates
515 crossbar
520 segment
530 half-shell
533 strips
FIGS. 6A-6C:
612 chain link
614 lateral region
615 cross bar
617 hinge bolt
618 recess
660 protrusions
662 recess
664 tapering
FIGS. 7A-7B
700 energy chain
710 envelope
712 chain link
714 lateral region
715 crossbar
716 housing
FIGS. 8A-8C
800 energy chain
810 envelope (corrugated tube)
811 connecting element
812 chain link
816 housing
818 hinge element
870 connecting flange
871, 872 clamp collar
873 detent hook
874 recess
875 front end portion
876 rear end portion
877 through holes
878 connecting screws
880 feed-through sealing gasket
882 bracket
FIGS. 9A-9B
710/810 envelope (corrugated tube)
712, 812 chain link
818 hinge element
T pitch
λ wavelength

What is claimed is:
1. An energy chain for a plurality of supply lines in a clean room application, comprising:
a plurality of chain links disposed between a fixed connector and a movable connector;
the plurality of chain links articulable to each other, wherein the plurality of chain links present a housing for a passage of said plurality of supply lines;
wherein adjacent chain links of the plurality of chain links are pivotable against each other by a hinged connection configured to provide a movable deflection zone having a predetermined curvature between the fixed connector and the movable connector;

characterized in that wherein a bendable, tubular envelope circumferentially surrounds the plurality of chain links between said two connectors in a continuous closed manner and serving as a containment to prevent release of configured to contain abrasion particles, wherein the tubular envelope is supported and entrained by at least a portion of the plurality of chain links;

wherein the tubular envelope is formed of a material which is elastic and sufficiently flexible for absorbing said predetermined curvature of the deflection zone and for following movement thereof; and wherein the tubular envelope is configured as a corrugated tube.

2. The energy chain according to claim 1, wherein the tubular envelope is formed of a synthetic material, and continuously as one piece in a longitudinal direction between the fixed connector and the movable connector.

3. The energy chain according to claim 1, wherein the tubular envelope has a wavelength λ which in relation to a pitch T of the plurality of chain links satisfies $T/\lambda \geq 2$.

4. The energy chain according to claim 1, wherein at least one of the fixed connector and the movable connector includes a connecting flange.

5. The energy chain according to claim 4, wherein the connecting flange comprises two clamp collars, wherein the two clamp collars are connectable to each other and surround the tubular envelope in a dust-proof manner, wherein the two clamp collars are connectable by a force-fit and/or a positive-fit.

6. The energy chain according to claim 5, wherein the connecting flange includes a front end portion and a rear end portion, wherein the front end portion and the rear end portion are connectable by the force-fit and/or positive-fit, and wherein a sealing gasket for a dust-proof feed-through of the plurality of supply lines is located between the front end portion and the rear end portion.

7. The energy chain according to claim 1, wherein the tubular envelope has a substantially oval, elliptical or rounded rectangular cross section transversely to a longitudinal direction of the tubular envelope.

8. The energy chain according to claim 1, wherein said tubular envelope comprises a plurality of modular segments connected to each other in a circumferentially closed manner.

9. The energy chain according to claim 8, wherein at least one of the modular segments comprise a first half-shell and a second half-shell, wherein the first half-shell and the second half-shell surround at least one of the chain links in a circumferentially closed manner and are connectable by along a joint extending in a longitudinal direction of the tubular envelope of the energy chain.

10. The energy chain according to claim 8, wherein teeth are provided on each of the first half-shell and the second half-shell which engage along said longitudinal joint, and the first half-shell and the second half shell are connectable by at least one clamping strip.

11. The energy chain according to claim 8, wherein adjacent segments of the plurality of modular segments are frontally connected to each other in a circumferentially closed manner, wherein the adjacent segments have opposing front faces which engage each other by positive locking; and/or are connected by force-fit and/or positive-fit to an interposed connecting element.

12. The energy chain according to claim 8, wherein a frame-like bracket connects adjacent segments of the plurality of modular segments of the tubular envelope to each other and/or holds adjacent segments of the plurality of modular segments of the tubular envelope.

13. The energy chain according to claim 12, wherein each chain link of said plurality of chain links includes at least one crossbar, and said frame-like bracket is attached as a separate component to the at least one crossbar or a lateral region of the chain link for the at least one crossbar.

14. The energy chain according to claim 1, wherein the tubular envelope surrounds the plurality of chain links in a circumferential direction and in a longitudinal direction with little or minimum play.

15. The energy chain according to claim 1, wherein adjacent chain links of the plurality of chain links are pivotable against each other by a hinged connection comprising at least one elastically bendable hinge element.

16. The energy chain according to claim 1, wherein at least a portion of the plurality of chain links present opposing lateral regions connected by crossbars and an intermediate space thereof forms the respective housing for the passage of the plurality of supply lines.

17. An envelope for a cable guide for encapsulated guiding of a plurality of supply lines, in a clean room application, wherein:

the envelope has a tubular configuration in order to circumferentially surround the cable guide between two connectors in a continuous closed manner and has a bendable configuration for absorbing a predefined curvature of a deflection zone and following reciprocating movement thereof;

wherein the envelope is assembled in a longitudinal direction of a plurality of modular segments, which are respectively connected to each other in a circumferentially closed manner, and wherein at least a portion of said modular segments respectively comprise a first half-shell and a second half-shell for surrounding at least a section of the cable guide in a circumferentially closed manner and for serving as a containment configured to contain abrasion particles, and wherein the material of which said half-shells are made is elastic and sufficiently flexible for absorbing the predefined curvature of the deflection zone and following reciprocating movement thereof.

18. The envelope according to claim 17, wherein said first half-shell and said second half-shell are connectable by longitudinal joints at a level of a neutral fiber layer of the cable guide.

19. The envelope according to claim 18, wherein said first half-shell and said second half-shell are identically designed and have mirror-symmetrically arranged mechanical connectors for interconnecting the first half-shell and the second-half shell.

20. The envelope according to claim 17, wherein the opposing front faces of the segments engage each other by positive fit.

* * * * *

UNITED STATES PATENT AND TRADEMARK OFFICE
CERTIFICATE OF CORRECTION

PATENT NO. : 9,464,689 B2  
APPLICATION NO. : 14/778961  
DATED : October 11, 2016  
INVENTOR(S) : Hermey et al.

Page 1 of 1

It is certified that error appears in the above-identified patent and that said Letters Patent is hereby corrected as shown below:

In the Claims

In Column 13, Line 4, in Claim 1, before "wherein" delete "characterized in that".

In Column 13, Line 7, in Claim 1, after "containment" delete "to prevent release of".

In Column 13, Line 8, in Claim 1, delete "particles," and insert -- particles; --, therefor.

In Column 14, Line 1, in Claim 11, delete "locking;" and insert -- locking --, therefor.

In Column 14, Line 28, in Claim 17, delete "lines," and insert -- lines --, therefor.

Signed and Sealed this  
Tenth Day of January, 2017

Michelle K. Lee  
*Director of the United States Patent and Trademark Office*